US012060873B2

(12) United States Patent
Takahashi

(10) Patent No.: US 12,060,873 B2
(45) Date of Patent: Aug. 13, 2024

(54) CRYOPUMP AND CONTROL METHOD FOR CRYOPUMP

(71) Applicant: SUMITOMO HEAVY INDUSTRIES, LTD., Tokyo (JP)

(72) Inventor: Kakeru Takahashi, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/204,441

(22) Filed: Mar. 17, 2021

(65) Prior Publication Data

US 2021/0293230 A1 Sep. 23, 2021

(30) Foreign Application Priority Data

Mar. 18, 2020 (JP) ................................ 2020-048148

(51) Int. Cl.
*F04B 37/08* (2006.01)
*F04B 49/03* (2006.01)
*F04B 49/06* (2006.01)

(52) U.S. Cl.
CPC ........... *F04B 37/085* (2013.01); *F04B 37/08* (2013.01); *F04B 49/03* (2013.01); *F04B 49/065* (2013.01); *F04B 2205/03* (2013.01); *F05B 2210/12* (2013.01)

(58) Field of Classification Search
CPC .............................. F04B 37/08; F04B 37/085
USPC .......................................................... 62/55.5
See application file for complete search history.

(56) References Cited

U.S. PATENT DOCUMENTS

2012/0180503 A1 7/2012 Oikawa
2014/0260338 A1* 9/2014 Kimura .................. F04B 37/08
62/55.5
2016/0245270 A1* 8/2016 Yatsu ................... F04B 49/065

FOREIGN PATENT DOCUMENTS

JP H03-012234 B2 2/1991
JP 2012-149530 A 8/2012

* cited by examiner

*Primary Examiner* — John F Pettitt, III
(74) *Attorney, Agent, or Firm* — Michael Best & Friedrich LLP

(57) ABSTRACT

A cryopump includes a cryopump container, a pressure sensor that measures a pressure in the cryopump container and generates time-series pressure data indicating the measured pressure, a vent valve that is provided on the cryopump container, is electrically operable to open and close, and is capable of being mechanically opened by a differential pressure between inside and outside the cryopump container, and a controller that, during cryopump regeneration, detects stabilization of the measured pressure based on the time-series pressure data from the pressure sensor and controls the vent valve to open upon detection of the stabilization of the measured pressure.

17 Claims, 4 Drawing Sheets

CRYOPUMP AND CONTROL METHOD FOR CRYOPUMP

RELATED APPLICATIONS

The content of Japanese Patent Application No. 2020-048148, on the basis of which priority benefits are claimed in an accompanying application data sheet, is in its entirety incorporated herein by reference.

BACKGROUND

Technical Field

Certain embodiments of the present invention relate to a cryopump and a control method for a cryopump.

Description of Related Art

A cryopump is a vacuum pump that captures gas molecules through condensation and adsorption on a cryopanel and exhausts the gas molecules cooled to a cryogenic temperature. The cryopump is used in general in order to realize a clean vacuum environment required for semiconductor circuit manufacturing processes. Since the cryopump is a so-called gas storage type vacuum pump, regeneration in which the captured gas is periodically exhausted to the outside is required.

In one known cryopump, a vent valve opening and closing operation for exhausting a gas is controlled based on a cryopump internal pressure measured by a pressure sensor. In addition, the vent valve is configured as a safety valve that is mechanically opened by a differential pressure between inside and outside the cryopump, and can release an excessively high pressure which can be generated in the cryopump during regeneration.

SUMMARY

According to an embodiment of the present invention, there is provided a cryopump including a cryopump container, a pressure sensor that measures a pressure in the cryopump container and generates time-series pressure data indicating the measured pressure, a vent valve that is provided on the cryopump container, is electrically operable to open and close, and is capable of being mechanically opened by a differential pressure between inside and outside the cryopump container, and a controller that, during cryopump regeneration, detects stabilization of the measured pressure based on the time-series pressure data from the pressure sensor and controls the vent valve to open upon detection of the stabilization of the measured pressure.

According to another embodiment of the present invention, there is provided a control method for a cryopump. The cryopump includes a cryopump container, a pressure sensor, and a vent valve that is provided on the cryopump container, is electrically operable to open and close, and is capable of being mechanically opened by a differential pressure between inside and outside the cryopump container. The control method includes using the pressure sensor to measure a pressure in the cryopump container and generate time-series pressure data indicating the measured pressure and detecting stabilization of the measured pressure based on the time-series pressure data and controlling the vent valve to open upon detection of the stabilization of the measured pressure.

DETAILED DESCRIPTION

The present inventor has examined the cryopump described above and has recognized the followings. As a pressure sensor provided in the cryopump, a type that can measure vacuum or preferably from vacuum to the atmospheric pressure is adopted. In many cases, this type of pressure sensor does not directly measure a pressure, but indirectly measures a pressure based on interaction between a gas and the sensor. For example, a Pirani vacuum gauge is a measurement based on heat transfer, has a high-temperature thin metal wire, and measures a pressure from cooling of the thin metal wire as gas molecules collide with the thin metal wire and take heat away. Such an indirect measuring system cannot avoid a measurement error that depends on the temperature of a gas and the physical properties of the gas.

During the regeneration of the cryopump, the temperature of the cryopump fluctuates over a wide temperature range from the cryogenic temperature to the room temperature or a temperature higher than the room temperature, and the cryopump includes a mixture of various types of captured and vaporized gases. Therefore, a measured pressure from the pressure sensor, which is obtained during the regeneration of the cryopump, can include a large error. As a result, the vent valve opening and closing operation based on the measured pressure from the pressure sensor can also be inappropriate.

It is desirable to open a vent valve during regeneration of a cryopump at an appropriate timing.

Any combination of the components described above and a combination obtained by switching the components and expressions of the present invention between methods, devices, and systems are also effective as an aspect of the present invention.

Hereinafter, an embodiment for carrying out the present invention will be described in detail with reference to the drawings. In the description and drawings, the same or equivalent components, members, and processing will be assigned with the same reference symbols, and redundant description thereof will be omitted as appropriate. The scales and shapes of the illustrated parts are set for convenience in order to make the description easy to understand, and are not to be understood as limiting unless stated otherwise. The embodiment is merely an example and does not limit the scope of the present invention. All characteristics and combinations to be described in the embodiment are not necessarily essential to the invention.

Figure 1:
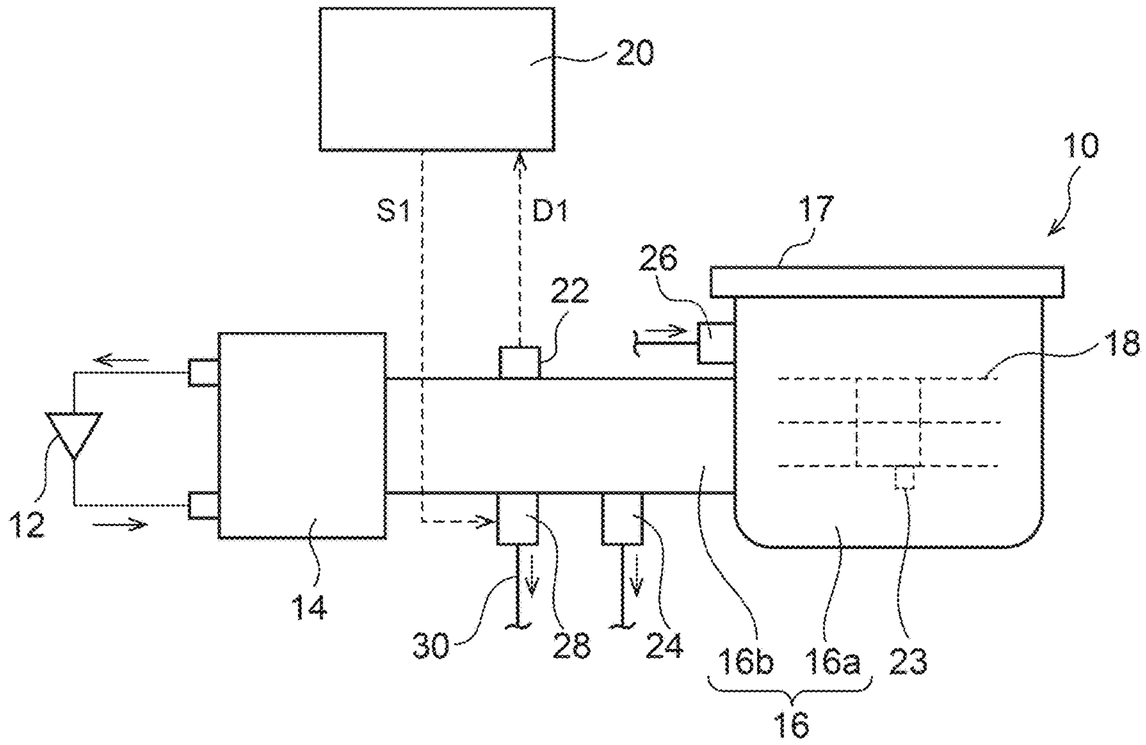
FIG. 1 schematically illustrates a cryopump according to an embodiment.

FIG. 1 schematically illustrates a cryopump 10 according to the embodiment. The cryopump 10 is attached to, for example, a vacuum chamber of an ion implanter, a sputtering device, a deposition device, or other vacuum process devices, and is used in order to increase a degree of vacuum inside the vacuum chamber to a level required for a desired vacuum process. For example, a high degree of vacuum of approximately $10^{-5}$ Pa to $10^{-8}$ Pa is realized in the vacuum chamber.

The cryopump 10 includes a compressor 12, a cryocooler 14, a cryopump container 16, a cryopanel 18, and a controller 20. In addition, the cryopump 10 includes a pressure sensor 22, a rough valve 24, a purge valve 26, and a vent valve 28, and the components are provided on the cryopump container 16.

The compressor 12 is configured to collect a refrigerant gas from the cryocooler 14, to pressurize the collected refrigerant gas, and to supply the refrigerant gas to the cryocooler 14 again. The cryocooler 14 is also called an expander or a cold head, and configures a cryocooler together with the compressor 12. A thermodynamic cycle, through which chill is generated, is configured by performing circulation of the refrigerant gas between the compressor 12 and the cryocooler 14 with an appropriate combination of pressure fluctuations and volume fluctuations of the refrigerant gas in the cryocooler 14, and thereby a cooling stage of the cryocooler 14 can be cooled to a desired cryogenic temperature. Accordingly, the cryopanel 18 thermally coupled to the cooling stage of the cryocooler 14 can be cooled to a target cooling temperature (for example, 10 K to 20 K). Although the refrigerant gas is typically a helium gas, other appropriate gases may be used. In order to facilitate understanding, a direction in which the refrigerant gas flows is shown with an arrow in FIG. 1. Although the cryocooler is, for example, a two-stage Gifford-McMahon (GM) cryocooler, the cryocooler may be a pulse tube cryocooler, a Stirling cryocooler, or other types of cryocoolers.

The cryopump container 16 is a vacuum chamber that is designed to maintain vacuum during vacuum exhaust operation of the cryopump 10 and to withstand a pressure in the ambient environment (for example, the atmospheric pressure). The cryopump container 16 has a cryopanel accommodation unit 16*a* having an intake port 17 and a cryocooler accommodation unit 16*b*. The cryopanel accommodation unit 16*a* has a dome shape in which the intake port 17 is opened and an opposite side thereof is closed, and the cryopanel 18 is accommodated therein together with the cooling stage of the cryocooler 14. The cryocooler accommodation unit 16*b* has a cylindrical shape, and has one end connected to a room temperature portion of the cryocooler 14 and the other end connected to the cryopanel accommodation unit 16*a*. The cryocooler 14 is inserted therein. A gas that enters from the intake port 17 of the cryopump 10 is captured through condensation or adsorption in the cryopanel 18. Since various known configurations can be adopted as appropriate as configurations of the cryopump 10, such as the disposition and shape of the cryopanel 18, description thereof will not be made in detail.

The controller 20 is configured to control the cryopump 10. The controller 20 may be integrally provided with the cryopump 10, or may be configured as a control device separately from the cryopump 10.

The controller 20 may control the cryocooler 14 based on the cooling temperature of the cryopanel 18 in the vacuum exhaust operation of the cryopump 10. A temperature sensor 23 that measures the temperature of the cryopanel 18 may be provided in the cryopump container 16, the controller 20 may be connected to the temperature sensor 23 so that a temperature sensor output signal indicating the measured temperature of the cryopanel 18 can be received.

In addition, in regeneration operation of the cryopump 10, the controller 20 may control the cryocooler 14, the rough valve 24, the purge valve 26, and the vent valve 28 based on a pressure in the cryopump container 16 (or if necessary, based on the temperature of the cryopanel 18 and the pressure in the cryopump container 16). The controller 20 may be connected to the pressure sensor 22 to receive a pressure sensor output signal indicating a measured pressure in the cryopump container 16 (for example, including time-series pressure data D1 to be described later).

Although details will be described later, during cryopump regeneration, the controller 20 detects the stabilization of a measured pressure based on the time-series pressure data D1 from the pressure sensor 22, and performs control to open the vent valve 28 in a case where the stabilization of the measured pressure is detected.

The internal configuration of the controller 20 is realized by an element or a circuit including a CPU and a memory of a computer as a hardware configuration and is realized by a computer program as a software configuration, but is shown in the drawings as a functional block realized in cooperation therewith. It is clear for those skilled in the art that the functional blocks can be realized in various manners in combination with hardware and software.

For example, the controller 20 can be mounted in combination with a processor (hardware) such as a central processing unit (CPU) and a microcomputer and a software program executed by the processor (hardware). Such a hardware processor may be configured by, for example, a programmable logic device such as a field programmable gate array (FPGA), or may be a control circuit such as a programmable logic controller (PLC). The software program may be a computer program for causing the controller 20 to execute the regeneration of the cryopump 10.

The pressure sensor 22 measures a pressure in the cryopump container 16, and generates the time-series pressure data D1 indicating the measured pressure. The pressure sensor 22 is attached to the cryopump container 16, for example, the cryocooler accommodation unit 16*b*. The pressure sensor 22 may generate the time-series pressure data D1 by sequentially outputting data of measured pressure values so as to be accumulated in the controller 20. Since the pressure sensor 22 periodically measures a pressure in the cryopump container 16, the time-series pressure data D1 indicates changes in the measured pressure in the cryopump container 16 over time. In other words, the time-series pressure data D1 includes at least two or more pressure measurement values which are measured at time points different from each other.

The pressure sensor 22 has a wide measurement range including both of vacuum (for example, 1 to 10 Pa, which is an operation starting pressure of the cryopump 10) and the atmospheric pressure. It is desirable that the measurement range includes at least a range of a pressure that can be generated during regeneration processing. In the embodiment, an atmospheric pressure Pirani gauge (Pirani vacuum gauge that can measure the atmospheric pressure) is used as the pressure sensor 22. Alternatively, the pressure sensor 22 may be, for example, a crystal gauge or other pressure sensors that indirectly measure a pressure based on interaction between a gas and the sensor.

The rough valve 24 is attached to the cryopump container 16, for example, the cryocooler accommodation unit 16*b*. The rough valve 24 is connected to a rough pump (not illustrated) provided outside the cryopump 10. The rough pump is a vacuum pump for evacuating the cryopump 10 to the operation starting pressure. The cryopump container 16 communicates with the rough pump when the rough valve 24 is opened through control by the controller 20. The cryopump container 16 is cut off from the rough pump when the rough valve 24 is closed. By opening the rough valve 24 and operating the rough pump, the cryopump 10 can be decompressed.

The purge valve 26 is attached to the cryopump container 16, for example, to the cryopanel accommodation unit 16*a*. The purge valve 26 is connected to a purge gas supply device (not illustrated) provided outside the cryopump 10. A purge gas is supplied to the cryopump container 16 when the purge valve 26 is opened through control by the controller 20. The purge gas supply to the cryopump container 16 is cut off when the purge valve 26 is closed. The purge gas may be, for example, a nitrogen gas or other dry gases. The temperature of the purge gas may be adjusted, for example, to the room temperature, or may be heated to a temperature higher than the room temperature. By opening the purge valve 26 and introducing the purge gas into the cryopump container 16, the cryopump 10 can be pressurized. In addition, the temperature of the cryopump 10 can be increased from the cryogenic temperature to the room temperature or a temperature higher than the room temperature.

The vent valve 28 is attached to the cryopump container 16, for example, the cryocooler accommodation unit 16*b*. The vent valve 28 is provided in order to exhaust a fluid from the inside of the cryopump 10 to the outside. The vent valve 28 is connected to an exhaust line 30 that guides the exhausted fluid to a storage tank (not illustrated) outside the cryopump 10. Alternatively, in a case where the exhausted fluid is harmless, the vent valve 28 may be configured to discharge the exhausted fluid to the ambient environment. The fluid exhausted from the vent valve 28 is basically a gas, but may be a liquid or a mixture of a gas and a liquid.

The vent valve 28 is capable of being opened and closed through control and can be mechanically opened by a differential pressure between inside and outside the cryopump container 16. The vent valve 28 is, for example, a closed-type control valve, and is configured to function also as a so-called a safety valve. Further, a valve closing force is set in advance for the vent valve 28 so as to be opened when a predetermined differential pressure is applied. The valve opening differential pressure can be set as appropriate, for example, in consideration of an internal pressure that can be applied to the cryopump container 16 or structural durability. Since the external environment of the cryopump 10 is usually the atmospheric pressure, the valve opening differential pressure is set to a predetermined value with the atmospheric pressure as reference. The setting of the valve closing force of the vent valve 28 will be described later with reference to FIG. 2.

The vent valve 28 is opened and closed in accordance with a command signal S1 input from the controller 20. The vent valve 28 is opened by the controller 20 when discharging a fluid from the cryopump 10 such as during regeneration. When the fluid is not to be discharged, the vent valve 28 is closed by the controller 20. On the other hand, the vent valve 28 is mechanically opened when a valve opening differential pressure is applied. For this reason, the vent valve 28 is mechanically opened without requiring control when the inside of the cryopump has become high-pressure for some reason. Accordingly, the high pressure therein can be released. In this manner, the vent valve 28 functions as a safety valve. By using the vent valve 28 also as a safety valve in this manner, it is possible to obtain advantages of cost reduction and space saving compared with a case where two valves are respectively provided.

Figure 2:
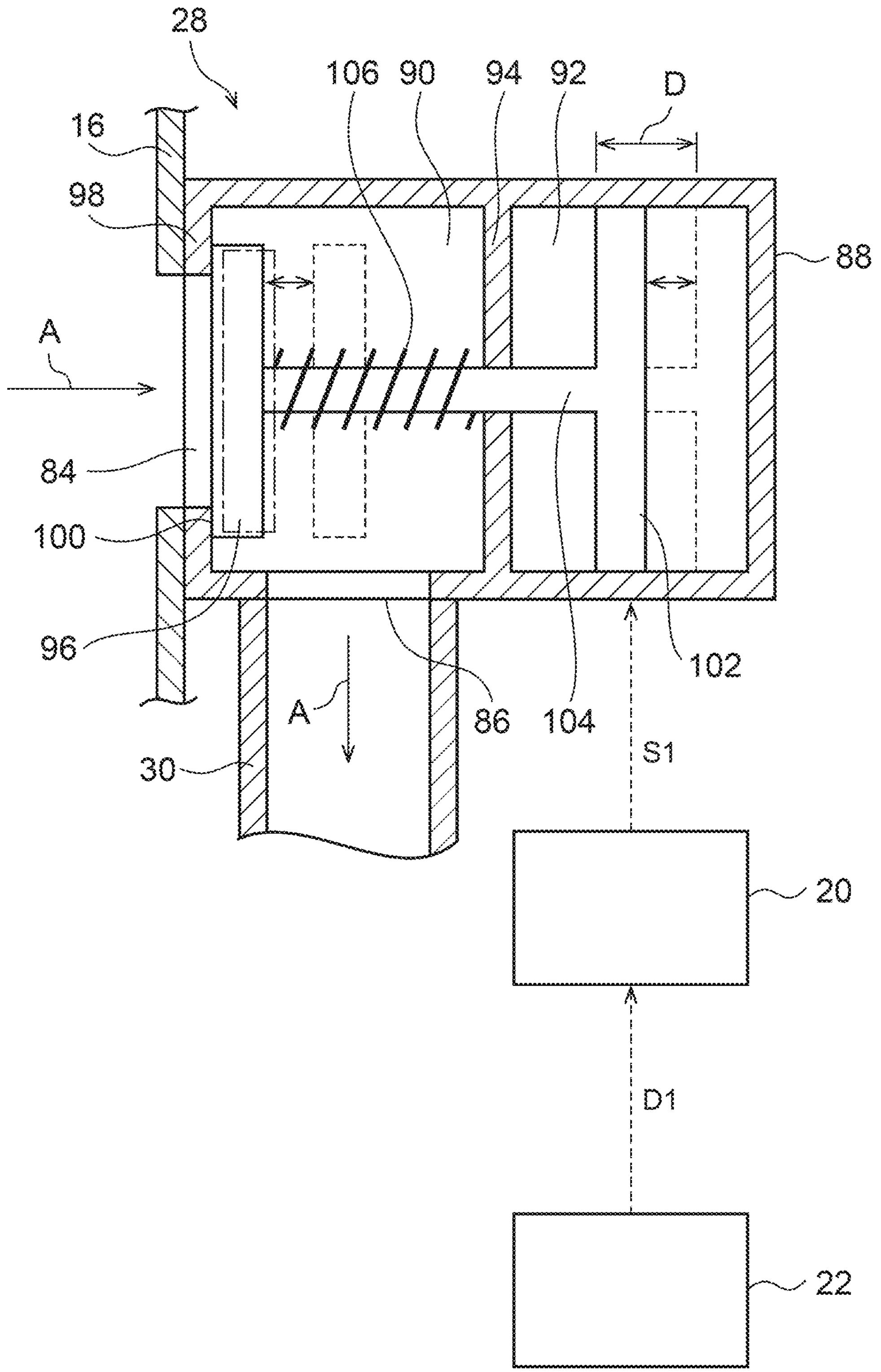
FIG. 2 is a schematic view illustrating a vent valve illustrated in FIG. 1 in further detail.

FIG. 2 is a schematic view illustrating the vent valve 28 illustrated in FIG. 1 in further detail. In a closed state shown with a solid line in FIG. 2, the vent valve 28 cuts off circulation from a vacuum port 84 to an exhaust port 86. The vacuum port 84 is connected to the cryopump container 16, and the exhaust port 86 is connected to the exhaust line 30 (or may be directly opened to the external environment). On the other hand, the vent valve 28 in an open state allows an exhaust flow A from the vacuum port 84 to the exhaust port 86. A dashed line shows the position of a valve body in an open state. The exhaust flow A flowed from the vacuum port 84 into the vent valve 28 is bent in a vertical direction inside the vent valve 28 and flows out from the exhaust port 86.

The vent valve 28 has a valve chamber 90 and a piston chamber 92 by being partitioned by a valve casing 88 from the outside. The valve chamber 90 and the piston chamber 92 are adjacent to each other, and a partition plate 94 partitions the vent valve into the valve chamber and the piston chamber. The partition plate 94 is an inner wall of the valve chamber 90, which faces the vacuum port 84. Two openings are provided in the valve chamber 90. One opening is the vacuum port 84 described above, and the other opening is the exhaust port 86.

A valve plate 96, which is the valve body of the vent valve 28, is accommodated in the valve chamber 90. An external dimension of the valve plate 96 is larger than an opening dimension of the vacuum port 84 such that an outer peripheral portion of the valve plate 96 is pressed against a surrounding portion 98 of the vacuum port 84. For example, the valve plate 96 and the vacuum port 84 are both concentric circles, and the valve plate 96 has a diameter larger than the vacuum port 84. A region where the outer peripheral portion of the valve plate 96 is pressed against the surrounding portion 98 of the vacuum port 84 (for example, an annular region) functions as a sealing surface 100. An O-ring (not illustrated) for sealing is provided on the sealing surface 100. This O-ring is accommodated in, for example, a groove portion formed in the valve plate 96 in the sealing surface 100.

A piston 102, which is a part of a valve drive mechanism of the vent valve 28, is accommodated in the piston chamber 92. The piston 102 is supported such that outer side surfaces thereof are slidable on an inner wall of the piston chamber 92. The piston chamber 92 is divided into two chambers by the piston 102. The piston 102 is connected to the valve plate 96 by a connecting shaft 104. The connecting shaft 104 is a rod-shaped member that vertically extends from a center portion of a surface of the valve plate 96 in an opposite direction to the sealing surface 100, and is fixed to the piston 102. The connecting shaft 104 penetrates the partition plate 94, and is supported by, for example, a bearing (not illustrated) to be movable in the through-hole in an axial direction. Accordingly, the piston 102 is slidable in the axial direction of the connecting shaft 104 along the inner wall of the piston chamber 92. By being fixed to the connecting shaft 104, the valve plate 96 is movable in the axial direction integrally with the piston 102.

The valve drive mechanism is, for example, a pneumatic drive mechanism. That is, as compressed air is supplied to the piston chamber 92, the piston 102 is driven. The valve drive mechanism may include a solenoid valve for switching between the supply and the stop of supply of the compressed air to the piston chamber 92. A compressed air feed port and an exhaust port are provided in one of the chambers of the piston chamber 92 divided by the piston 102, and the feed port and the exhaust port are connected to a compressed air supply system including the solenoid valve. The controller 20 controls the opening and closing of the solenoid valve. When the solenoid valve is opened, the compressed air is supplied to the piston chamber 92, and the piston 102 is moved from an initial position. When the solenoid valve is closed, the compressed air from the piston chamber 92 is discharged and the piston 102 returns to the initial position by the action of a spring 106 to be described later.

The valve drive mechanism may be any other drive mechanism. For example, the piston 102 may be a so-called direct drive type that is directly driven by electromagnetic attraction of a solenoid, or may be a type in which the valve body is driven by an appropriate motor such as a linear motor and a stepping motor.

The vent valve 28 includes a valve closing mechanism including the spring 106. The spring 106 is provided in order to apply a sealing pressure to the sealing surface 100 by pressing the outer peripheral portion of the valve plate 96 against the surrounding portion 98 of the vacuum port 84. The spring 106 biases the valve plate 96 in an opposite direction to the exhaust flow A flowing in from the vacuum port 84. The spring 106 is provided along the connecting shaft 104 such that one end is attached to the surface of the valve plate 96 in the opposite direction to the sealing surface 100 and the other end is attached to the partition plate 94. In this manner, the vent valve 28 is configured as a closed-type control valve.

The spring 106 is attached to an attachment load of a predetermined compressing force, and the attachment load determines the valve closing force of the vent valve 28. That is, when a differential pressure force applied to the valve plate 96 due to a differential pressure exceeds a spring attachment load, that is, a valve closing force, the valve plate 96 is somewhat moved due to the differential pressure force and the vent valve 28 is opened (one-dot chain line). By this valve opening, a flow from the vacuum port 84 to the exhaust port 86 is allowed. During the vacuum exhaust operation of the cryopump 10, the pressure is lower on a vacuum side than on an exhaust side. Since the spring 106 biases the valve plate 96 against the vacuum port 84, the vent valve 28 is not mechanically opened. In an unusual situation where the pressure is higher on a vacuum port 84 side than on an exhaust port 86 side, the vent valve 28 can be mechanically opened.

The valve closing mechanism of the vent valve 28 is not limited to a spring type. The valve closing mechanism may be, for example, a valve closing mechanism by means of a magnetic force. By fixing the valve plate 96 and the surrounding portion 98 of the vacuum port 84 to each other by the attraction of the magnetic force, a desired valve closing force may be applied. In this case, at at least one of the valve plate 96 and the surrounding portion 98 of the vacuum port 84, a magnet for applying attraction therebetween may be provided. Alternatively, the valve closing mechanism may be a valve closing mechanism by means of electrostatic adsorption or other appropriate valve closing mechanisms.

The vent valve 28 is a control valve controlled by the controller 20 based on measurement results from the pressure sensor 22. The controller 20 determines whether or not the internal pressure of the cryopump container 16, which is measured by the pressure sensor 22, exceeds a setting pressure. In a case where it is determined that the setting pressure is exceeded, the controller 20 causes the valve drive mechanism to open the vent valve 28. That is, the controller 20 moves the piston 102 and the valve plate 96 from a position in a valve closed state (hereinafter, the position will be called a closed position or an initial position in some cases) to a position in an open state (hereinafter, the position will be called an open position in some cases). In FIG. 2, the closed position is shown with a solid line, and the open position is shown with a dashed line.

On the other hand, in a case where it is determined that the internal pressure of the cryopump container 16, which is measured by the pressure sensor 22, does not reach the setting pressure, the controller 20 maintains the piston 102 and the valve plate 96 at the closed position. In this case, as the controller 20 does not operate the valve drive mechanism, the piston 102 and the valve plate 96 are maintained at the closed position by the valve closing force of the spring 106.

The setting pressure for controlling the opening and closing of the vent valve 28 is set to a pressure of the external environment of the cryopump 10. Alternatively, in a case where it is important to reliably prevent backflow from the outside to the inside of the pump when the vent valve 28 is opened, the setting pressure is set to be slightly higher than the pressure of the external environment. Since the pressure of the external environment is typically the atmospheric pressure, the setting pressure for controlling the opening and closing of the vent valve 28 is set to the atmospheric pressure or a pressure slightly higher than the atmospheric pressure (for example, a level within 0.1 atm in terms of gauge pressure). In this manner, when the inside of the cryopump 10 has a pressure higher than the outside, for example, during regeneration, the vent valve 28 can be opened through control and the internal pressure can be released to the outside.

In many cases, the control valve is configured to reliably maintain an open state (or a closed state) when the control valve is open (or closed) through control in an assumed use environment. When the control valve is a closed-type control valve, a valve closing force is larger than an assumed maximum differential pressure such that the valve is not opened out of control in a differential pressure range assumed to be applied to the valve in a closed state.

However, one feature of the vent valve 28 is that a valve closing force is adjusted such that the vent valve can be mechanically opened within an assumed pressure range. The valve closing force of the vent valve 28 is adjusted such that the vent valve is mechanically opened by the action of a differential pressure between a positive pressure generated inside the cryopump container 16 when the controller 20 closes the vent valve 28 and an outside pressure. Specifically, the valve closing force is adjusted such that the vent valve 28 is mechanically opened due to a valve opening differential pressure exceeding a differential pressure assumed during normal operation of the cryopump 10. Herein, the normal operation includes both of exhaust operation and regeneration operation of the cryopump 10. The vent valve 28 is mechanically opened, for example, in a case where an abnormality occurs in a control system of the vent valve 28 or a case where the inside of the cryopump container 16 is excessively pressurized for some reason.

A valve opening differential pressure at which the vent valve 28 is mechanically opened may be equal to the setting pressure at which the vent valve 28 is opened through control by the controller 20, or may be higher than the setting pressure. The valve opening differential pressure and the setting pressure may be, in terms of gauge pressure, for example, within 1 atm or within 0.5 atm, or may be, for example, within a range of 0.2 atm to 0.3 atm.

An opening and closing stroke D of the valve body of the vent valve 28, which is caused by the controller 20, may be larger than the amount of movement of the valve body, which is caused by mechanical valve opening by the action of a differential pressure. That is, the vent valve 28 is configured such that the opening and closing stroke D by the valve drive mechanism is larger than the amount of movement of the valve plate 96 when a valve opening differential pressure is applied. The opening and closing stroke of mechanical valve opening is minute. The opening and closing control of the vent valve 28 by the controller 20 can reduce a risk in which foreign matter particles included in the exhaust flow A are introduced into the vent valve 28, compared with mechanical valve opening. Accordingly, the sealability of the vent valve 28 can be maintained well.

As vacuum exhaust operation is continued, a gas accumulates in the cryopump 10. In order to exhaust the accumulated gas to the outside, the regeneration of the cryopump 10 is performed. The regeneration operation includes a temperature increasing process, an exhausting process, and a cooling down process.

In the temperature increasing process, with a purge gas supplied to the cryopump container 16 through the purge valve 26 or other heating means, the temperature of the cryopump 10 is increased from the cryogenic temperature to the room temperature or a regeneration temperature higher than the room temperature (for example, approximately 290 K to approximately 300 K). Simultaneously, since a gas captured in the cryopump 10 is again vaporized and the purge gas is supplied, a pressure in the cryopump container 16 increases toward the atmospheric pressure or a pressure somewhat higher than the atmospheric pressure (that is, the valve opening differential pressure of the vent valve 28 or the setting pressure).

In the exhausting process, a gas is exhausted from the cryopump container 16 to the outside through the vent valve 28 or the rough valve 24. When a pressure in the cryopump container 16 is decompressed to approximately the operation starting pressure of the cryopump 10 and it is detected that a pressure increase rate falls below a predetermined value, the exhausting process is terminated. Next, through the cooling down process, the cryopump 10 is cooled from the regeneration temperature to the cryogenic temperature again. In this manner, regeneration ends, and the cryopump 10 can start vacuum exhaust operation again.

Although depending on a measuring system of the pressure sensor 22 during the regeneration of the cryopump 10, a measured pressure (absolute pressure) from the pressure sensor 22 can include a measurement error. For example, since a Pirani vacuum gauge is based on heat transfer between gas molecules and a thin metal wire, a measurement error depending on the temperature of a gas and the physical properties of the gas cannot be avoided. In particular, in the temperature increasing process, the temperature of the cryopump 10 fluctuates over a wide temperature range from the cryogenic temperature to the room temperature or a temperature higher than the room temperature, and the cryopump 10 includes a mixture of various types of captured and vaporized gases. Therefore, the measured pressure from the pressure sensor 22 can include a large error.

When the opening and closing control of the vent valve 28 is performed by the controller 20 in a state where a measured pressure from the pressure sensor 22 is deviated from an actual pressure in the cryopump container 16, the setting pressure described above becomes an intermediate value between the measured pressure and an actual pressure in some cases. In this case, based on the fact that the setting pressure is approximately the same as the atmospheric pressure, the followings exemplified below can occur.

When the measured pressure exceeds the setting pressure and the actual pressure falls below the setting pressure, backflow from the exhaust line 30 into the cryopump container 16 through the vent valve 28 can occur. This is because the controller 20 opens the vent valve 28 since the measured pressure exceeds the setting pressure, but in this case, the actual pressure in the cryopump container 16 is lower than the setting pressure, that is, may be lower than the atmospheric pressure. A sensitive gas (for example, a toxic, flammable, and/or corrosive gas) that is often used in semiconductor manufacturing processes flows in the exhaust line 30 in some cases. It is desirable to avoid such a gas flowing back to the cryopump 10 as much as possible.

In order to avoid this, when the setting pressure is set to a higher pressure, it is difficult to perform control to open the vent valve 28. Instead of being opened through control when the internal pressure of the cryopump 10 is high, a possibility that the vent valve 28 is mechanically opened as a safety valve is high. A case where the control of the vent valve 28 by the controller 20 effectively functions is limited, and thereby it can be meaningless to configure the vent valve 28 as a controllable valve. In addition, as described above, since the amount of movement of the valve body is small when mechanically opening the vent valve 28, foreign matters are likely to be introduced, which is also not desired.

Conversely, in a case where the measured pressure falls below the setting pressure and the actual pressure exceeds the setting pressure, the controller 20 does not open the vent valve 28 regardless of the fact that the actual pressure exceeds the setting pressure. Also in this case, the vent valve 28 is mechanically opened when the actual pressure exceeds the valve opening differential pressure of the vent valve 28. As expected, a case where the control of the vent valve 28 by the controller 20 effectively functions is limited. A safety valve operation of the vent valve 28 can cause foreign matters to be introduced. In order to avoid this, when the setting pressure is set to a lower pressure, a risk of backflow is high this time.

Figure 3:
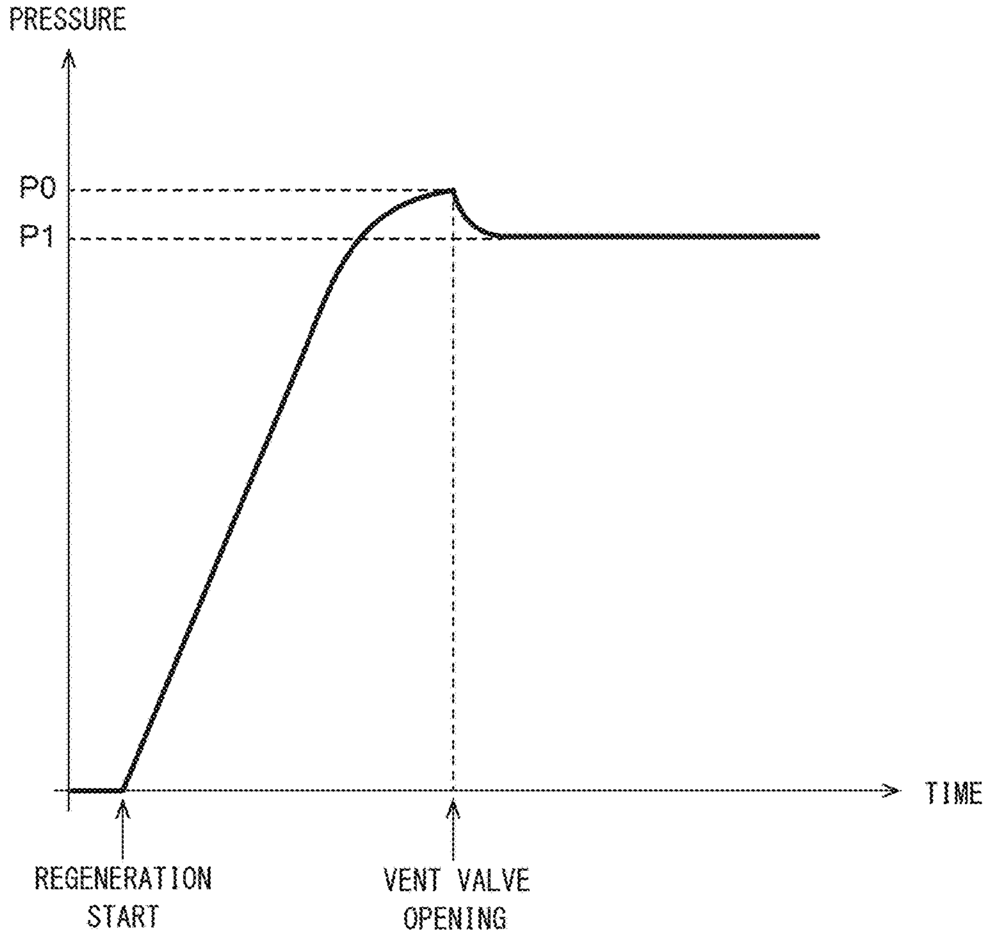
FIG. 3 is a schematic graph showing an increase in an internal pressure of a cryopump container, which can occur during regeneration of the cryopump.

FIG. 3 is a schematic graph showing an increase in the internal pressure of the cryopump container 16, which can occur during the regeneration of the cryopump 10. FIG. 3 shows changes in the pressure assumed in the cryopump container 16 over time in the temperature increasing process.

As shown, when regeneration is started, the pressure in the cryopump container 16 increases, due to the revaporization of a captured gas and the supply of a purge gas. Herein, the control of the vent valve 28 by the controller 20 is not considered. When the pressure in the cryopump container 16 reaches a valve opening differential pressure P0 of the vent valve 28, the vent valve 28 operates as a safety valve and is opened mechanically. The pressure in the cryopump container 16 slightly declines from the valve opening differential pressure P0 at a moment when the vent valve 28 is mechanically opened, and after then, is generally maintained at a constant pressure P1. This is based on a balance between a force received by the valve body of the vent valve 28 from an exhaust flow through the vent valve 28 and the valve closing force of the vent valve 28.

Therefore, in the embodiment, during cryopump regeneration, the controller 20 detects the stabilization of a measured pressure based on the time-series pressure data D1 from the pressure sensor 22, and performs control to open the vent valve 28 in a case where the stabilization of the measured pressure is detected. The time-series pressure data D1 includes at least two or more measured pressure values measured at time points different from each other. Accordingly, the controller 20 may calculate a changed amount of the measured pressure in the cryopump container 16 based on the measured pressure values of the time-series pressure data D1. Further, the controller 20 may detect the stabilization of the measured pressure based on the changed amount of the calculated measured pressure, and perform control to open the vent valve 28 in a case where the stabilization of the measured pressure is detected.

A decline in the pressure in the cryopump container 16 or maintaining the pressure afterwards is regarded as the stabilization of the pressure. By detecting the stabilization of the pressure, it is possible to know a timing when the vent valve 28 is mechanically opened as a safety valve, that is, a timing when the internal pressure of the cryopump 10 reaches the valve opening differential pressure P0 of the vent valve 28.

At a timing when the vent valve 28 is mechanically opened as a safety valve, it is physically guaranteed that a cryopump internal pressure is higher than an external pressure. Accordingly, even when the vent valve 28 is opened through control at this timing, backflow to the cryopump container 16 through the vent valve 28 cannot occur. In addition, as described above, since the opening and closing stroke of the vent valve 28 by the controller 20 is large compared with a mechanical valve, a risk of foreign matters being introduced into the vent valve 28 is also lowered.

Due to a measurement error of the pressure sensor 22, the value of the measured pressure (absolute pressure) can be deviated from the actual pressure in the cryopump container 16. However, the way the measured pressure changes, which increases until the vent valve 28 is opened and stabilizes when the vent valve 28 is opened (that is, progress of the changed amount of the measured pressure), does not have a great effect on the measurement error of the pressure sensor 22.

The detection of mechanical opening of the vent valve 28 is based on fluctuations (relative pressure) in a pressure to be measured by the pressure sensor 22. Accordingly, the accuracy of the detection does not depend on the measurement accuracy of the absolute pressure of the pressure sensor 22 to be used. Also in a case of using any type of pressure sensor, the same degree of accuracy is expected.

In this manner, during the regeneration of the cryopump 10, at a timing exactly when the vent valve 28 is to be opened, the vent valve 28 can be appropriately opened.

In general, although a pressure sensor that accurately measures an absolute pressure is expensive, a pressure sensor that accurately measures a relative pressure is available at a relatively low price. Accordingly, an inexpensive pressure sensor can be adopted as the pressure sensor 22. This leads to the reduction of manufacturing costs of the cryopump 10.

In addition, the controller 20 may detect the stabilization of the measured pressure based on the time-series pressure data D1 while the temperature of the cryopump 10 increases from the cryogenic temperature to the regeneration temperature, and perform control to open the vent valve 28 in a case where the stabilization of the measured pressure is detected. While the temperature of the cryopump 10 increases, the temperature greatly fluctuates. Moreover, various gases can be included in the cryopump container 16, and the composition of the mixed gases is also unknown. Accordingly, while the temperature increases, a measurement error (absolute pressure) of the pressure sensor 22 tends to be particularly large. Therefore, while the temperature of the cryopump 10 increases, detecting the stabilization of the measured pressure from the pressure sensor 22 and opening the vent valve 28 through control are particularly effective.

Next, an exemplary control configuration of the cryopump 10 will be described with reference to an example.

Figure 4:
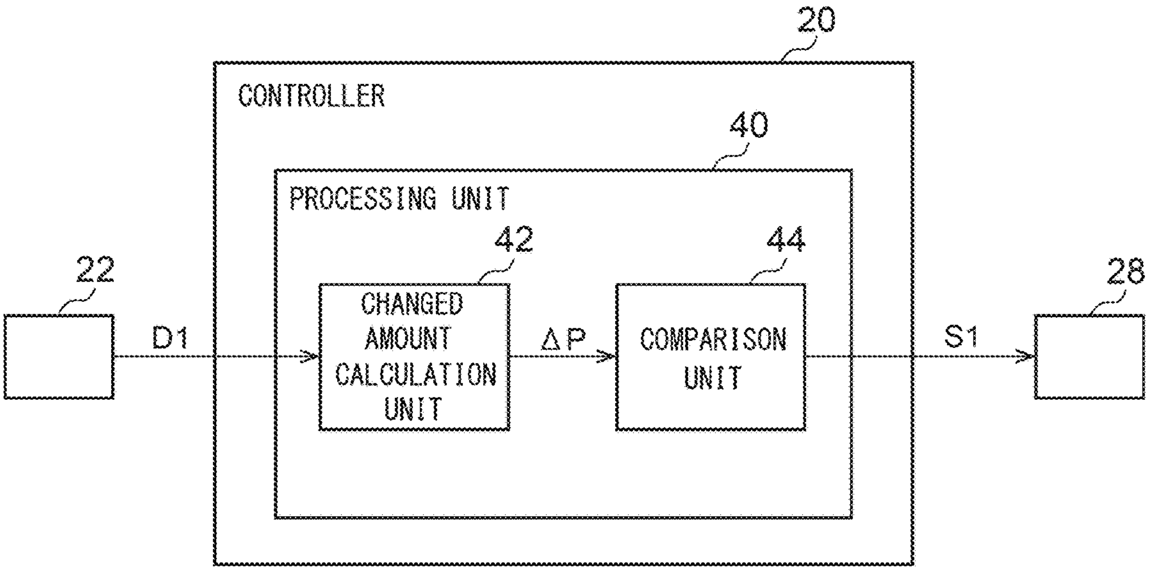
FIG. 4 is a block diagram of a controller according to an example.
Figure 5:
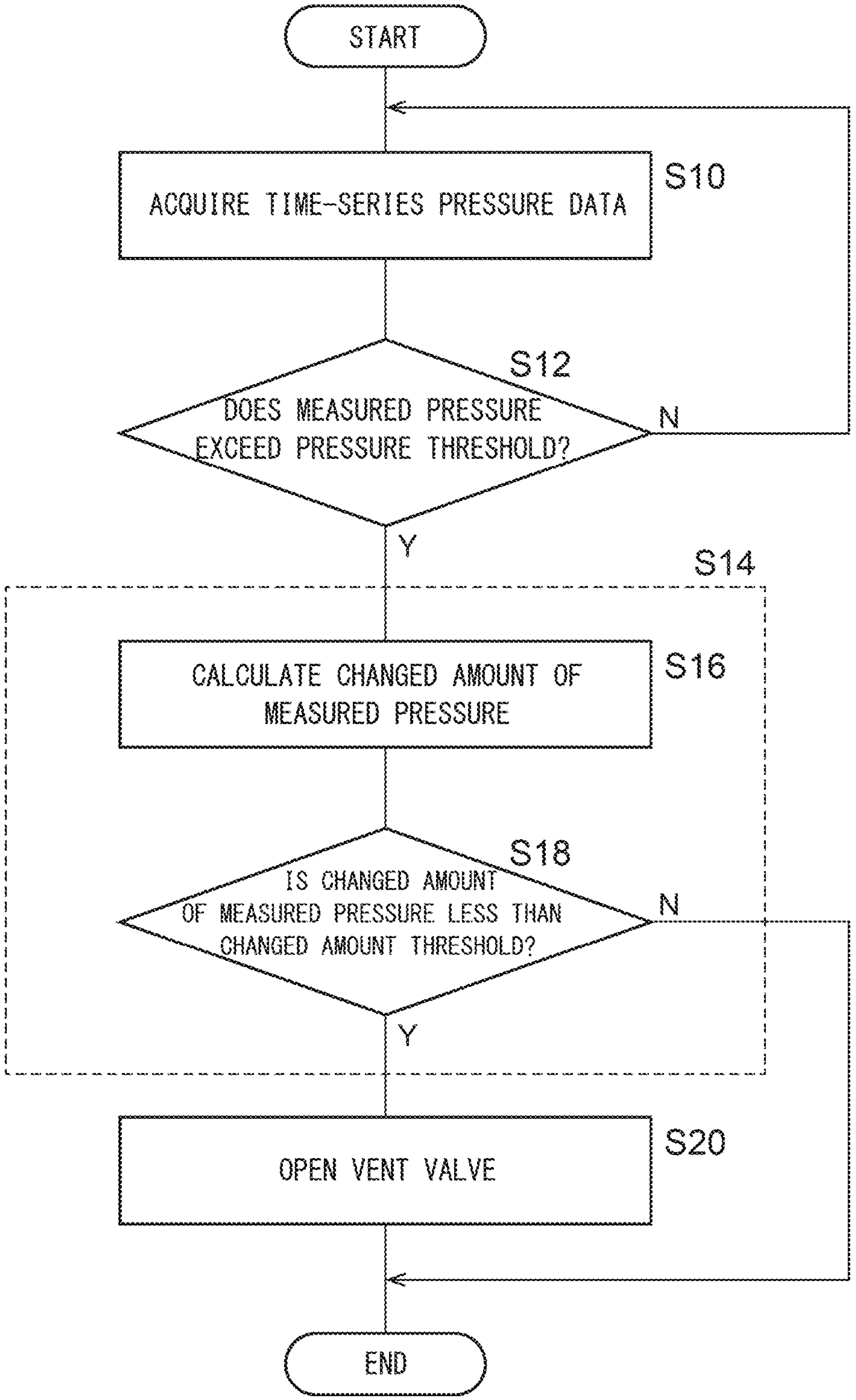
FIG. 5 is a flowchart showing a control method for a cryopump according to the example.

FIG. 4 is a block diagram of the controller 20 according to the example. FIG. 5 is a flowchart showing a control method for the cryopump 10 according to the example.

As shown in FIG. 4, the controller 20 includes a processing unit 40 that receives the time-series pressure data D1 from the pressure sensor 22 and performs calculation processing on the time-series pressure data D1. The processing unit 40 includes a changed amount calculation unit 42 that calculates a changed amount ΔP of a measured pressure in the cryopump container 16 from the time-series pressure data D1 and a comparison unit 44 that compares the changed amount ΔP of the measured pressure with a changed amount threshold. The controller 20 generates the command signal S1 in accordance with an output of the comparison unit 44 and outputs the command signal to the vent valve 28.

Control processing shown in FIG. 5 is executed by the controller 20 during the regeneration of the cryopump 10, for example, at least in the temperature increasing process. This processing is performed when the vent valve 28 is closed.

First, the controller 20 acquires the time-series pressure data D1 (S10). For example, data indicating the latest measured pressure obtained by the pressure sensor 22 is input from the pressure sensor 22 to the controller 20, and this data is added to the time-series pressure data D1 already accumulated in the controller 20.

The controller 20 determines whether or not the measured pressure exceeds a pressure threshold (S12). This determination is made in order to prevent the vent valve 28 from being opened due to malfunction. This is because during regeneration, the stabilization of a pressure in the cryopump container 16 can occur under decompression through the rough valve 24. Alternatively, due to some abnormalities such as a failure of a purge valve and the stop of supply of a purge gas, a situation in which the pressure in the cryopump container 16 remains at a level sufficiently lower than the atmospheric pressure can be assumed. In order to prevent the vent valve 28 from being opened through control under such decompression, the pressure threshold may be a value smaller than the atmospheric pressure, for example, may be selected from a range of 0.9 atm to 0.5 atm.

In a case where the measured pressure falls below the pressure threshold (N of S12), the present processing is temporarily terminated, and is executed again from the start. On the other hand, in a case where the measured pressure exceeds the pressure threshold (Y of S12), the present processing is continued.

Instead of or in addition to determining whether or not the measured pressure exceeds the pressure threshold, the controller 20 may determine whether or not the purge valve 26 is open.

Next, the controller 20 detects the stabilization of the measured pressure based on the time-series pressure data D1 (S14). In this stabilization detecting processing, first, the controller 20 calculates the changed amount ΔP of the measured pressure from the time-series pressure data D1 (S16). For example, the changed amount calculation unit 42 may extract the current measured pressure and the previous measured pressure from the time-series pressure data D1, and calculate a difference therebetween as the changed amount ΔP. Herein, the "measured pressure" is not limited to only one measurement value, or may be an average value of a plurality of consecutive measurement values. For example, in a case where the pressure sensor 22 measures a pressure every 0.1 seconds, the changed amount may be a difference between the latest measurement value and a measurement value 0.1 seconds before that, or may be a difference between an average value of measurement values for the latest 1 second and an average value of measurement values for 1 second before that. The changed amount may be a difference between moving averages (that is, a difference between a moving average calculated this time and a moving average calculated previously). In addition, the changed amount ΔP may be calculated as a ratio, or may be a ratio between the current and previous measured pressures, or an average value (or a moving average) of the current and previous measured pressures.

The comparison unit 44 compares the changed amount ΔP of the measured pressure with the changed amount threshold (S18). The changed amount threshold can be set to a value, for example, 0.1 atm or 10% in the form of a relative pressure or a ratio. It is possible to set the changed amount threshold as appropriate based on empirical knowledge of a designer or experiments and simulations by the designer.

As described above, while the pressure increases due to revaporization of a gas in the cryopump container 16 (and/or the supply of a purge gas), the changed amount ΔP of the measured pressure exceeds the changed amount threshold. On the other hand, the pressure in the cryopump container 16 is stabilized as the pressure is sufficiently increased and the vent valve 28 is mechanically opened, and the changed amount ΔP of the measured pressure is expected to be less than the changed amount threshold.

Accordingly, in a case where the changed amount ΔP of the measured pressure is less than the changed amount threshold (Y of S18), the controller 20 generates the command signal S1 indicating the opening of the vent valve 28, and outputs the command signal to the vent valve 28. The vent valve 28 is opened in accordance with the command signal S1 (S20). On the other hand, in a case where the changed amount ΔP of the measured pressure exceeds the changed amount threshold (N of S18), the controller 20 does not generate the command signal S1 indicating the opening of the vent valve 28 or generates the command signal S1 indicating the closing of the vent valve 28 and outputs the command signal to the vent valve 28. Therefore, the vent valve 28 maintains a closed state. In this manner, the present processing is terminated.

As described above, during the regeneration of the cryopump 10, the controller 20 can perform control to open the vent valve 28 in accordance with a timing when the vent valve 28 is mechanically opened.

In the process shown in FIG. 5, in a state where the stabilization of the measured pressure is detected, the controller 20 may acquire a measured pressure immediately before the opening of the vent valve 28 and/or after valve opening through control from the time-series pressure data D1, and set a setting pressure based on the acquire measured pressure. Herein, the setting pressure is the pressure threshold at which the vent valve 28 is opened through control by the controller 20 as described above, and the controller 20 opens the vent valve 28 in a case where a measured pressure in the cryopump container 16 exceeds the setting pressure. In this manner, based on the measured pressure when the vent valve 28 is mechanically opened (that is, when the measured pressure stabilizes), the setting pressure can be updated. The setting pressure may be updated to a value equal to the measured pressure, or may be updated to a value obtained by adding (or subtracting) a predetermined margin to the measured pressure.

Therefore, the processing shown in FIG. 5 may be executed at least one time during the regeneration of the cryopump 10. For example, the present processing may be executed at least one time while the temperature of the cryopump 10 is increased from the cryogenic temperature to the regeneration temperature or after the temperature has been increased.

In this manner, the controller 20 can update the setting pressure in accordance with a timing when the vent valve 28 is mechanically opened, and perform control to open the vent valve 28 using the updated setting pressure.

The present invention has been described based on the example. It is clear for those skilled in the art that the present invention is not limited to the embodiment, various design changes are possible, various modification examples are possible, and such modification examples are also within the scope of the present invention.

It should be understood that the invention is not limited to the above-described embodiment, but may be modified into various forms on the basis of the spirit of the invention. Additionally, the modifications are included in the scope of the invention.

What is claimed is:

1. A cryopump comprising:

a cryopump container;

a pressure sensor that is configured to consecutively measure a pressure in the cryopump container and generate time-series pressure data including at least two measured pressure values measured at time points different from each other;

a vent valve that is provided on the cryopump container, is electrically operable to open and close, and is capable of being mechanically opened by a differential pressure between inside and outside the cryopump container;

a purge valve that is provided on the cryopump container; and a controller configured to open the purge valve to supply a purge gas to the cryopump container, thereby increasing a temperature of the cryopump from a cryogenic temperature to a regeneration temperature, perform, responsive to the opening of the purge valve, iterative calculations of a changed amount of the at least two measured pressure values from the time-series pressure data measured, perform, responsive to the performing of the iterative calculations of the changed amount of the at least two measured pressure values, iterative comparisons of the changed amount of the at least two measured pressure values with a changed amount threshold, the iterative comparisons occurring in conjunction with the iterative calculations, and perform control of the vent valve to open when the iterative comparisons confirm that the changed amount of the at least two measured pressure values is less than the changed amount threshold.

2. The cryopump according to claim 1, wherein the controller is configured to perform the iterative calculations, the iterative comparisons, and the control of the vent value during the temperature increase of the cryopump from the cryogenic temperature to the regeneration temperature.

3. The cryopump according to claim 1, wherein the controller is further configured to responsive to the performing of the iterative calculations of the changed amount of the at least two measured pressure values, perform second iterative comparisons of one of the at least two measured pressure values with a sub-atmospheric threshold, and control the vent valve to open when the second iterative comparisons confirm that the one of the at least two measured pressure values exceed the sub-atmospheric threshold and the iterative comparisons confirm that the changed amount of the at least two measured pressure values is less than the changed amount threshold.

4. The cryopump according to claim 3, wherein the sub-atmospheric threshold is selected from a range of 0.5 atmosphere (atm) to less than 1 atm.

5. The cryopump according to claim 1, wherein the controller is further configured to determine a setting pressure based on a pressure value measured by the pressure sensor before and/or after the controlled opening of the vent valve, perform second iterative comparisons of one of the at least two measured pressure values with the setting pressure, and control the vent valve to open when the second iterative comparisons confirm that the one of the at least two measured pressure values exceeds the setting pressure.

6. A control method comprising:

opening a purge valve of a cryopump to supply a purge gas to a cryopump container of a cryopump, thereby increasing a temperature of the cryopump from a cryogenic temperature to a regeneration temperature;

consecutively measuring, with a controller and a pressure sensor, a pressure in the cryopump container during the supplying of the purge gas to the cryopump container to generate time-series pressure data including at least two measured pressure values that are measured at time points different from each other;

responsive to the opening of the purge valve, iteratively calculating, with the controller, a changed amount of the at least two measured pressure values from the time-series pressure data;

responsive to the iteratively calculating, iteratively comparing, with the controller, the changed amount of the at least two measured pressure values with a changed amount threshold; and controlling, with the controller, a vent valve of the cryopump to open when the iterative comparisons confirm that the changed amount of the at least two measured pressure values is less than the changed amount threshold.

7. The control method according to claim 6, wherein the iteratively calculating, the iteratively comparing, and the controlling are performed during the temperature increase of the cryopump from the cryogenic temperature to the regeneration temperature.

8. The control method according to claim 6, further comprising:

responsive to the performing of the iterative calculations of the changed amount of the at least two measured pressure values, perform second iterative comparisons of one of the at least two measured pressure values with a sub-atmospheric threshold; and controlling the vent valve to open when the second iterative comparisons confirm that the one of the at least two measured pressure values exceed the sub-atmospheric threshold and the iterative comparisons confirm that the changed amount of the at least two measured pressure values is less than the changed amount threshold.

9. The control method according to claim 8, wherein the sub-atmospheric threshold is selected from a range of 0.5 atmosphere (atm) to less than 1 atm.

10. The control method according to claim 6, further comprising:

determining a setting pressure based on a pressure value measured by the pressure sensor before and/or after the controlled opening of the vent valve;

perform second iterative comparisons of one of the at least two measured pressure values with the setting pressure; and controlling the vent valve to open when the second iterative comparisons confirm that the one of the at least two measured pressure values exceeds the setting pressure.

11. A non-transitory computer-readable medium comprising instructions that, when executed by a controller, cause the controller to perform a set of operations comprising:

opening a purge valve of a cryopump to supply a purge gas to a cryopump container of the cryopump, thereby increasing a temperature of the cryopump from a cryogenic temperature to a regeneration temperature;

controlling a pressure sensor to consecutively measure a pressure in the cryopump container during supplying the purge gas to the cryopump container to generate time-series pressure data including at least two measured pressure values that are measured at time points different from each other;

responsive to the opening of the purge valve, iteratively calculating a changed amount of the at least two measured pressure values from the time-series pressure data;

responsive to the iteratively calculating, iteratively comparing the changed amount of the at least two measured pressure values with a changed amount threshold; and controlling a vent valve of the cryopump to open when the iterative comparisons confirm that the changed amount of the at least two measured pressure values is less than the changed amount threshold.

12. The non-transitory computer-readable medium according to claim 11, wherein the iterative calculations start immediately after the opening of the purge valve.

13. The non-transitory computer-readable medium according to claim 11, wherein the set of operations further include closing the purge valve when the temperature of the cryopump reaches the regeneration temperature, and wherein the iterative calculations start before the closing of the purge valve.

14. The cryopump according to claim 1, wherein the iterative calculations start immediately after the opening of the purge valve.

15. The cryopump according to claim 1, wherein the controller is further configured to close the purge valve when the temperature of the cryopump reaches the regeneration temperature, and wherein the iterative calculations start before the closing of the purge valve.

16. The control method according to claim 6, wherein the iterative calculations start immediately after the opening of the purge valve.

17. The control method according to claim 6, further comprising:

closing the purge valve when the temperature of the cryopump reaches the regeneration temperature, and wherein the iterative calculations start before the closing of the purge valve.

* * * * *